(12) United States Patent
Pfeifer et al.

(10) Patent No.: US 9,347,354 B2
(45) Date of Patent: May 24, 2016

(54) REDUCTION-CATALYST-COATED DIESEL PARTICLE FILTER HAVING IMPROVED CHARACTERISTICS

(75) Inventors: Marcus Pfeifer, Solingen (DE); Stephan Basso, Frankfurt (DE); Franz Dornhaus, Frankfurt a. M. (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 597 days.

(21) Appl. No.: 13/583,516

(22) PCT Filed: Mar. 30, 2011

(86) PCT No.: PCT/EP2011/001578
§ 371 (c)(1),
(2), (4) Date: Sep. 7, 2012

(87) PCT Pub. No.: WO2011/128026
PCT Pub. Date: Oct. 20, 2011

(65) Prior Publication Data
US 2013/0004391 A1    Jan. 3, 2013

(30) Foreign Application Priority Data

Apr. 14, 2010 (EP) .................................. 10003923

(51) Int. Cl.
*B01D 53/94* (2006.01)
*F01N 3/20* (2006.01)
(Continued)

(52) U.S. Cl.
CPC .......... *F01N 3/2066* (2013.01); *B01D 53/9468* (2013.01); *F01N 3/0222* (2013.01); *F01N 3/035* (2013.01); *B01D 53/9418* (2013.01);
(Continued)

(58) Field of Classification Search
None
See application file for complete search history.

(56) References Cited

U.S. PATENT DOCUMENTS

| 4,749,671 A | 6/1988 | Saito et al. |
| 5,820,833 A | 10/1998 | Kawamura |

(Continued)

FOREIGN PATENT DOCUMENTS

| DE | 102 38 770 A1 | 3/2004 |
| DE | 103 23 607 A1 | 12/2004 |

(Continued)

OTHER PUBLICATIONS

English Translation of Written Opinion of the ISA from PCT/EP2011/001578.*

(Continued)

*Primary Examiner* — Colin W Slifka
(74) *Attorney, Agent, or Firm* — Smith, Gambrell & Russell, LLP (57) ABSTRACT

An SCR-catalytically active diesel particle filter having a ceramic wall flow filter substrate with inflow channels, outflow channels, walls separating the inflow and outflow channels, and two coatings. The first coating is applied in inflow channels, is composed of high-melting point materials, and closes the inflow sides of pores in walls connecting the inflow channels and outflow channels to soot particles without preventing passage of gaseous exhaust gas constituents. The second coating is within the walls between inflow channels and outflow channels, and effectively catalyzes the selective reduction of nitrogen oxides when in the presence of a reducing agent. The particle filter displays excellent banking-up pressure properties combined with high filtration efficiency and good regeneration properties; and displays good aging stability of NOx conversion activity.

20 Claims, 4 Drawing Sheets (51) Int. Cl.
*F01N 3/022* (2006.01)
*F01N 3/035* (2006.01)

(52) U.S. Cl.
CPC .............. *B01D2251/2062* (2013.01); *B01D 2255/20707* (2013.01); *B01D 2255/20723* (2013.01); *B01D 2255/20738* (2013.01); *B01D 2255/20761* (2013.01); *B01D 2255/20776* (2013.01); *B01D 2255/50* (2013.01); *B01D 2255/9155* (2013.01); *B01D 2255/9205* (2013.01); *B01D 2257/404* (2013.01); *B01D 2258/012* (2013.01); *F01N 2250/02* (2013.01); *F01N 2510/06* (2013.01); *Y02T 10/24* (2013.01)

(56) References Cited

U.S. PATENT DOCUMENTS

| | | | |
|---|---|---|---|
| 7,229,597 | B2 | 6/2007 | Patchett et al. |
| 7,264,785 | B2 | 9/2007 | Blakeman et al. |
| 7,498,010 | B2 | 3/2009 | Andreasson et al. |
| 7,763,222 | B2 | 7/2010 | Miyairi et al. |
| 7,799,298 | B2 | 9/2010 | Pfeifer et al. |
| 7,902,107 | B2 | 3/2011 | Patchett et al. |
| 8,122,603 | B2 | 2/2012 | Patchett et al. |
| 8,226,896 | B2 | 7/2012 | Pfeifer et al. |
| 2004/0037754 | A1 | 2/2004 | Van Setten et al. |
| 2004/0076565 | A1 | 4/2004 | Gandhi et al. |
| 2005/0042151 | A1 | 2/2005 | Alward et al. |
| 2005/0074374 | A1 | 4/2005 | Ogura |
| 2005/0266992 | A1 | 12/2005 | Ohno et al. |
| 2007/0065348 | A1 | 3/2007 | Ohno et al. |
| 2007/0110650 | A1 | 5/2007 | Pfeifer et al. |
| 2007/0137184 | A1 | 6/2007 | Patchett et al. |
| 2007/0157600 | A1* | 7/2007 | Spurk et al. ............ 60/274 |
| 2010/0058746 | A1* | 3/2010 | Pfeifer et al. .......... 60/297 |
| 2010/0135866 | A1 | 6/2010 | Mizuno et al. |
| 2010/0254862 | A1 | 10/2010 | Sato et al. |
| 2011/0091361 | A1 | 4/2011 | Reinsch et al. |
| 2011/0286903 | A1 | 11/2011 | Andreasson et al. |
| 2012/0014842 | A1 | 1/2012 | Dornhaus et al. |
| 2012/0034133 | A1 | 2/2012 | Patchett et al. |
| 2013/0004391 | A1 | 1/2013 | Pfeifer et al. |

FOREIGN PATENT DOCUMENTS

| | | |
|---|---|---|
| DE | 10 2006 040739 | 3/2008 |
| DE | 10 2007 021 468 | 11/2008 |
| EP | 0 789 135 A1 | 8/1997 |
| EP | 1 054 722 A1 | 11/2000 |
| EP | 1 054 722 B1 | 12/2001 |
| EP | 1 437 491 A1 | 7/2004 |
| EP | 1 663 458 A1 | 6/2006 |
| EP | 1 837 494 A2 | 9/2007 |
| EP | 1 961 933 A1 | 8/2008 |
| EP | 1 633 458 B1 | 1/2009 |
| EP | 2 158 956 A1 | 3/2010 |
| EP | 2 168 662 A1 | 3/2010 |
| JP | 06-033734 | 7/1992 |
| JP | 09-173866 | 7/1997 |
| JP | 2002-320807 | 11/2002 |
| JP | 2007-144371 | 6/2007 |
| JP | 2009-106913 | 5/2009 |
| WO | 99/39809 | 8/1999 |
| WO | 2005/014146 A1 | 2/2005 |
| WO | 2005/016497 A1 | 2/2005 |
| WO | 2008/005337 | 1/2008 |
| WO | WO 2010051877 A1 * | 5/2010 |

OTHER PUBLICATIONS

English Translation of JP 9-173866, Nakanishi et al, Jul. 1997.*
"Literaturstudie zum Thema Partikelmesstechnik für Dieselmotoren schwerer Nutzfahrzeuge", 2004, p. 20.
Melscoet-Chauvel et al., "High Porosity Cordierite Filter Development for NOx/PM reduction", Ceramic Engineering and Science Proceedings (2005), 26(8), pp. 11-19.
K. Ohno et al., "Characterization of High Porosity SiC-DPF", SAE Technical Papers, SAE 2002 World Congress.
Y. Mizuno et al., "Study on Wall Pore Structure for Next Generation Diesel Particulate Filter", SAE Technical Papers, SAE 2008 World Congress.
R-M. Heck et al., "Catalytic Air Pollution Control", Chapter 9, Diesel Catalyst Supports, John Wiley & Sons, 2002.
Kittelson David B., "Engine and Nanoparticles: A Review", Journal of Aerosol Science; vol. 29, No. 5/6, pp. 575-588, 1998.
R. Jones, Particle size analysis by lase diffraction, American Laboratory, Jan. 2003.
PCT Notification of Transmittal of Translation of the International Preliminary Examination Report (Form PCT/IB/338) mailed May 19, 2011 for Application No. PCT/EP2009/006618.
PCT International Preliminary Report on Patentability (Form PCT/IB/373) issued May 10, 2011 for Application No. PCT/EP2009/006618 (in English).
English translation of the PCT Written Opinion of the International Searching Authority (Form/ISA/237) issued May 4, 2011 for Application No. PCT/EP2009/006618.
International Search Report for PCT/EP2009/006618 mailed Dec. 21, 2009.
International Search Report for PCT/EP2011/001578 mailed May 25, 2011.
PCT Notification of Transmittal of Translation of the International Preliminary Examination Report (Form PCT/IB/338) mailed Oct. 26, 2012 for Application No. PCT/EP2011/001578 (in English).
PCT International Preliminary Report on Patentability (Form PCT/IB/373) issued Oct. 16, 2012 2010 for Application No. PCT/EP2011/001578 (in English).
English translation of the PCT Written Opinion of the International Searching Authority (Form/ISA/237) issued Oct. 14, 2012 for Application No. PCT/EP2011/001578 (in English).

* cited by examiner

Soot loading/g

Figure 6

REDUCTION-CATALYST-COATED DIESEL PARTICLE FILTER HAVING IMPROVED CHARACTERISTICS

The invention relates to a reduction-catalyst-coated diesel particle filter which has improved properties and is suitable for removing diesel soot and nitrogen oxides from the exhaust gas of diesel engines, in particular in vehicles.

The exhaust gas from motor vehicles powered by diesel engines contains not only carbon monoxide (CO) and nitrogen oxides ($NO_x$) but also constituents which originate from incomplete combustion of the fuel in the combustion chamber of the cylinder. These include residual hydrocarbons (HC), which are usually likewise present predominantly in gaseous form, and particle emissions, also referred to as "diesel soot" or "soot particles". These are complex agglomerates of predominantly carbon-containing solid particles and an adhering liquid phase which usually consists mostly of relatively long-chain hydrocarbon condensates. The liquid phase adhering to the solid constituents is also referred to as "soluble organic fraction, SOF" or "volatile organic fraction, VOF".

Gaseous residual hydrocarbons (HC) and carbon monoxide (CO) are typically removed by passing the exhaust gas over a conventional diesel oxidation catalyst. Particle filters are used for removing particle emissions. Reduction in the amount of nitrogen oxides in lean-burn diesel engine exhaust gases, i.e. from exhaust gases which have a superstoichiometric oxygen content, can be effected, for example, by means of the "SCR process" (SCR=selective catalytic reduction). In the SCR process, the exhaust gas from which nitrogen oxides are to be removed is passed after addition of ammonia or a compound which can be decomposed into ammonia as reducing agent over a specially formulated catalyst ("SCR catalyst") which effectively catalyzes comproportionation of the nitrogen oxides with ammonia to form nitrogen.

As a result of the increasingly demanding legal emission regulations, the systematic combination of a plurality of exhaust gas purification functions is becoming evermore important. Thus, to adhere to future limits, the combination of measures within the engine with catalytic exhaust gas after-treatment of only some exhaust gas components will foreseeably no longer be sufficient. In particular, it appears to be necessary to remove both nitrogen oxides and particles by means of the catalytic exhaust gas after-treatment for purification of diesel exhaust gases.

Various solutions for this have been proposed in the prior art. Thus, for example, EP 1 054 722 discloses an exhaust gas purification system for the treatment of combustion exhaust gas containing $NO_x$ and solid particles, which purification system comprises an oxidation catalyst, a particle filter and an SCR catalyst in combination and in this order. The oxidation catalyst is effective for converting at least part of the $NO_x$ in the $NO_x$ into $NO_2$ and thus increasing the $NO_2$ content of the exhaust gas. On the downstream side of this, there is a fines filter and an SCR catalyst. Between these two devices, there is arranged an injection device for a reduction liquid via which the required reducing agent for nitrogen oxide reduction is introduced into the exhaust gas from a source independent of the engine before the exhaust gas enters the SCR catalyst.

DE 103 23 607 also discloses an apparatus for purifying the exhaust gases containing nitrogen oxides and soot particles from an internal combustion engine, which comprises an oxidation catalyst, a particle filter and an SCR catalyst. This apparatus is characterized in that the SCR catalyst together with the particle filter are combined to form a structural unit which cannot be separated into SCR catalyst and particle filter without destroying the SCR catalyst and/or the particle filter.

EP 0 789 135 discloses an exhaust gas purification apparatus comprising filter elements for collecting particles from the exhaust gas of a diesel engine, electric wire meshes which are arranged on the inflow side of the filter elements and porous, ceramic elements at the outflow side of the filter elements. The ceramic elements are characterized in that they are formed by a large number of cells which are filled with granules having a brownmillerite structure and are therefore suitable for reducing the amount of $NO_x$ in the exhaust gas.

DE 102 38 770 by the applicant describes an apparatus for removing soot particles from the exhaust gas of a diesel engine, which has a wall flow filter which has alternately closed flow channels for the exhaust gas. The exhaust gas introduced into the inflow channels has to flow through the porous channel walls of the flow channels into the outflow channels. Additional structures for exhaust gas treatment are provided in the inflow and/or outflow channels of the filter. The channel walls of the flow channels and the additional structures are provided with a catalyst layer. The filter function of the porous channel walls and the catalytic function of the catalyst layer present on the additional structures are largely separate from one another. Here, the different functions preferably supplement one another, as a result of which a higher efficiency in the exhaust gas treatment is achieved at a low construction volume of the apparatus according to the invention. Depending on the desired catalytic functions, the filter can contain different, catalytically active coatings, thus also SCR-catalytically active coatings.

EP 1 663 458 discloses a catalytic product which comprises a wall flow filter substrate and an SCR catalyst composition. The SCR catalyst composition is applied as a coating which penetrates through the walls of the wall flow filter substrate in a concentration of at least 7926 g/l. The wall flow filter substrate has a wall porosity of at least 50% at an average pore size of at least 5 µm. In addition, a use method based on the use of this component and a corresponding exhaust gas purification system in which not only the abovementioned catalytic product but also an upstream oxidation catalyst and an injection facility which is arranged between oxidation catalyst and catalytic product and is designed for injection of reducing agent from a source independent of the engine are used are disclosed.

U.S. Pat. No. 7,264,785 describes a process for the selective catalytic reduction of nitrogen oxides in exhaust gases from lean-burn vehicle engines using an exhaust gas purification system. This exhaust gas purification system comprises a first SCR catalyst which effectively catalyzes the selective catalytic reduction of $NO_x$ by means of a nitrogen-containing reducing agent and is arranged more than 1 meter downstream of the exhaust gas bend or the turbine outlet of the engine. The system comprises a particle filter which is in an underbody position and contains a second SCR catalyst.

The functionalization of ceramic wall flow filter substrates increasingly appears to be a suitable alternative to the series arrangement of various catalytic exhaust gas purification devices when effective particle removal and reduction in the amount of gaseous exhaust gas constituents have to be ensured simultaneously. However, conventional filters provided with SCR catalyst coatings frequently display an exorbitant increase in the banking-up pressure during the soot loading phase and have poor banking-up pressure behavior in the soot-laden state. Fundamentally, a high banking-up pressure and also a rapid increase in the banking-up pressure is undesirable in diesel particle filters which are used in motor vehicles since in operation this leads to engine power having to be expended in order to "push" exhaust gas through the exhaust gas purification system. This engine power is lost to powering of the vehicle. However, optimal utilization of the engine power for powering the vehicle is equivalent to an increase in the effective fuel usage and offers fuel consumption advantages and thus also reduced $CO_2$ emissions from the vehicle. A further result of poor banking-up pressure behavior is that the filter has to be reactivated more frequently by active burning-off of soot. Furthermore, conventional reduction-catalyst-coated filters have a significantly impaired, passive regeneration behavior compared to uncoated or oxidation-catalyst-coated embodiments: compared to an uncoated filter, the amount of soot which is oxidized in situ by $NO_2$ during operation with loading with soot and is burnt off in this way is considerably smaller. This likewise leads to conventional reduction-catalyst-coated filters frequently having to be actively regenerated, i.e. regenerated by targeted heating to above the soot ignition temperature. Furthermore, a reduced filtration efficiency compared to other catalytically coated filters has not infrequently been observed for actively reduction-catalyst-coated filters. Finally, the reduction catalyst coating displays a poorer long-term stability in respect of conversion of $NO_x$ compared to conventional SCR catalysts since the more frequent active particle filter regenerations represent a considerable thermal stress on the catalytically active coating and lead to accelerated thermal deactivation of the catalytically active sites.

It was an object of the present invention to provide a diesel particle filter which is functionalized with an SCR-catalytically active coating and does not have the abovementioned disadvantages.

Figure 5:
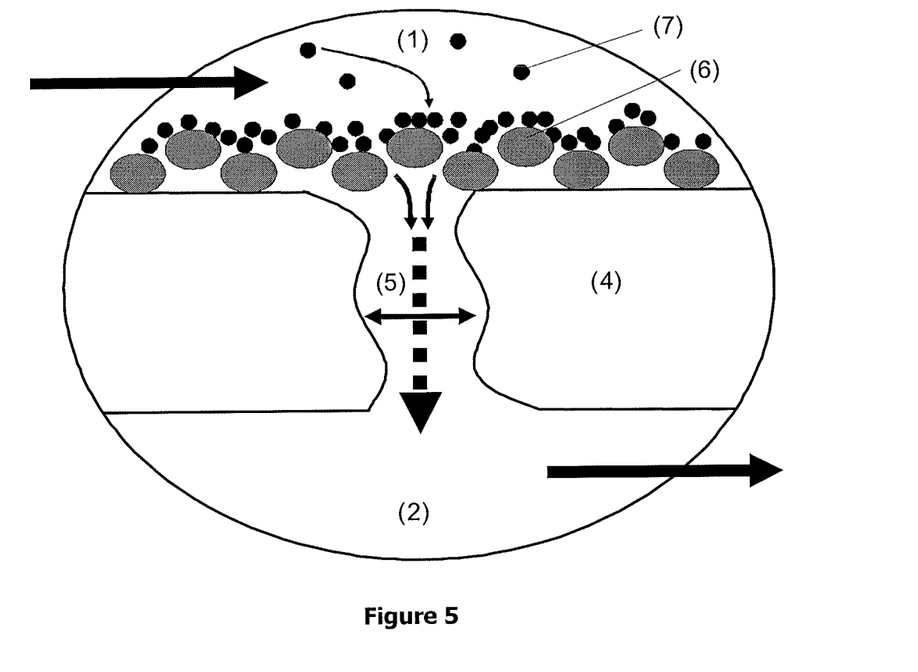
FIG. 5: Schematic depiction of a section of a diesel particle filter according to the invention containing a ceramic wall flow filter substrate and a coating (6) composed of high-melting point material, which coating is applied in the inflow channels (1) and is of such a nature that it closes the pores (5) in the wall (4) connecting the inflow channels (1) and the outflow channels (2) to soot particles (7) on the inflow side without preventing passage of the gaseous exhaust gas constituents.

This object is achieved by a diesel particle filter containing a ceramic wall flow filter substrate and two coatings. The first coating is composed of high-melting point material and is applied in the inflow channels. It is of such a nature that it closes the pores in the wall connecting the inflow channels and outflow channels to soot particles on the inflow side without preventing passage of the gaseous exhaust gas constituents [FIG. 5]. The second coating is introduced into the wall between inflow channels and outflow channels and is of such a nature that it effectively catalyzes the selective reduction of nitrogen oxides by means of a reducing agent, i.e. this second coating is an SCR-catalytically active coating.

To functionalize wall flow filter substrates with SCR catalysts, it is necessary to use highly porous filter bodies having relatively large pore diameters in order to be able to introduce sufficient amounts of the reduction-catalytically active coating into the substrate without the banking-up pressure of the exhaust gas over the component without soot becoming too great. This relatively high substrate porosity is, as studies by the inventors have shown, responsible for the reduced filtration efficiency which is not infrequently observed for conventional reduction-catalyst-coated filters. Furthermore, there is increased in-wall deep-bed filtration which causes the dramatic deterioration in the banking-up pressure behavior of conventional reduction-catalyst-coated filters during the soot loading phase.

Figure 1:
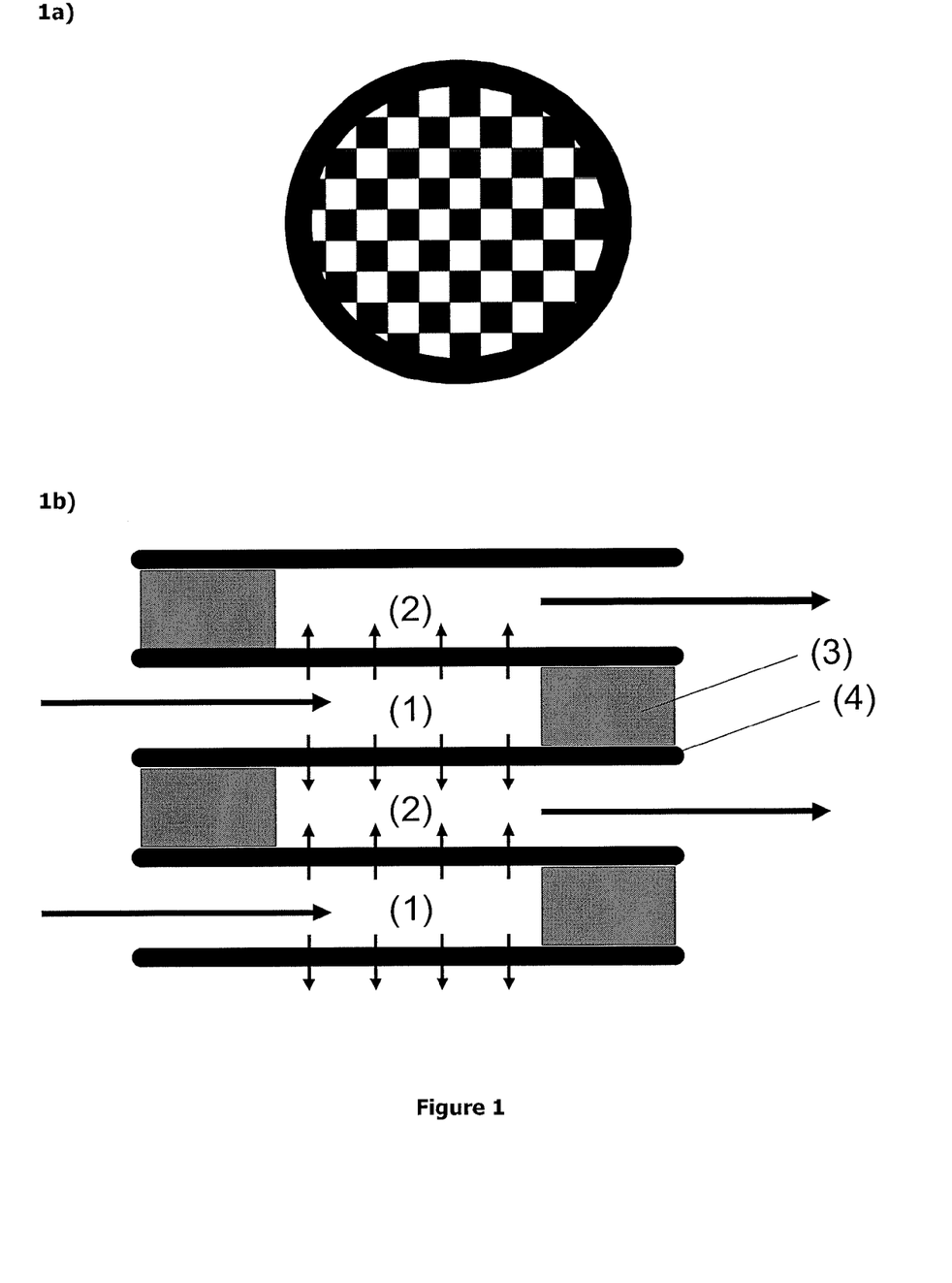
FIG. 1: Schematic depiction of a wall flow filter substrate;
part (1a) of the figure shows the plan view onto the end face with alternating open channels (shown in white) and channels closed in a gastight manner (shown in black);
part (1b) of the figure shows a section of the wall flow filter substrate as an in-principle sketch which indicates the mode of operation; here:
the arrows denote the flow direction of the exhaust gas:
(1) denotes an inflow channel;
(2) denotes an outflow channel;
(3) denotes a gastight closure stopper;
(4) denotes the porous, i.e. gas-permeable, wall.

Wall flow filter substrates are ceramic honeycomb bodies having inflow and outflow channels which are alternately closed in a gastight manner. FIG. 1 schematically shows such a wall flow filter substrate. The particle-containing exhaust gas flowing into the inflow channels (1) is forced by the gastight closure stopper (3) located on the outflow side to pass through the porous wall (4) and leaves the wall flow filter substrate again from the outflow channels (2) which are closed on the inflow side. Diesel soot is filtered out of the exhaust gas in this way.

Figure 2:
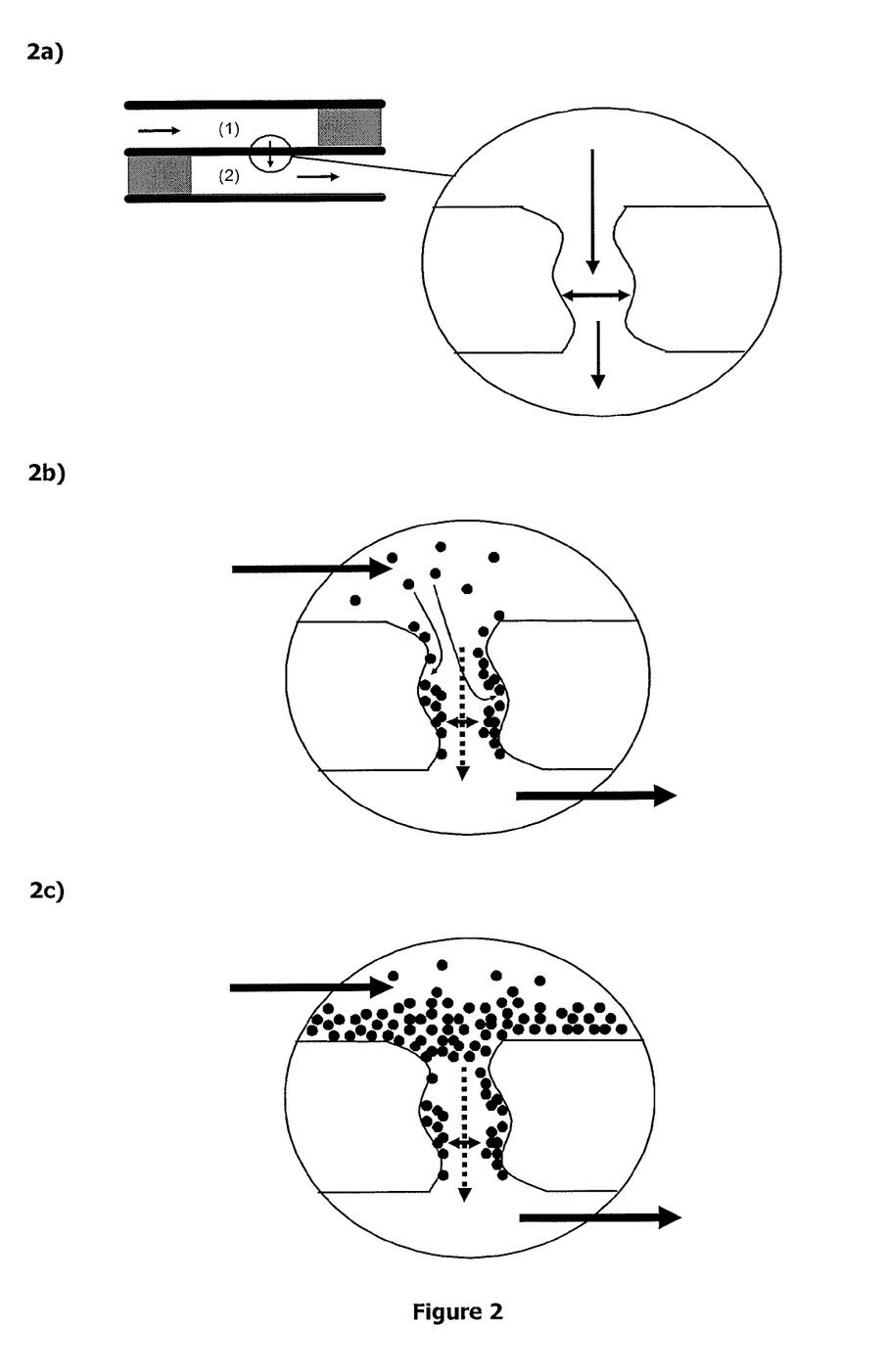
FIG. 2: Schematic depiction of the soot filtration process in a wall flow filter substrate; here:
the arrows denote the flow direction of the exhaust gas:
(1) denotes an inflow channel;
(2) denotes an outflow channel;
part (2a) of the figure shows an enlarged section of the wall of the wall flow filter substrate with pore;
part (2b) of the figure schematically shows the course of the deep-bed filtration;
part (2c) of the figure schematically shows the course of filtercake formation.
Figure 3:
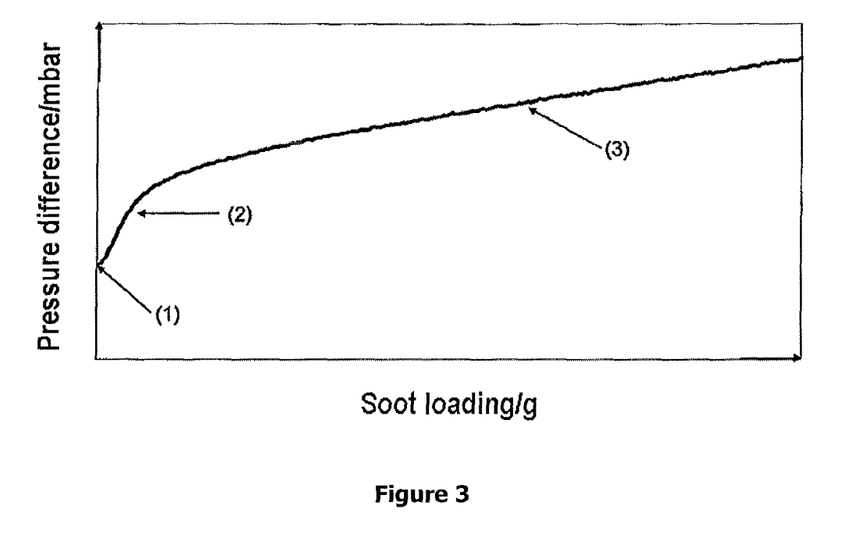
FIG. 3: Schematic depiction of the development of the banking-up pressure over a wall flow filter substrate as a function of the amount of soot taken up; here
(1) denotes the initial banking-up pressure in the soot-free state;
(2) denotes the banking-up pressure increase during the deep-bed filtration phase;
(3) denotes the increase in the banking-up pressure during the filtercake formation phase.

The soot filtration in the wall flow filter substrate during passage through the wall can be described as a two-stage process. In a first phase, the "deep-bed filtration phase", soot particles remain adhering in the pores of the wall on passage of the particle-containing exhaust gas through the wall [FIG. 2b]. This leads to a decrease in the pore diameter in the wall and as a result to a step increase in the banking-up pressure over the wall flow filter substrate. As soon as the pore diameter has decreased too greatly for medium and relatively large soot particles to enter the pores, filtercake formation [FIG. 2c] commences in the entire inflow channel. During buildup of the filtercake, the banking-up pressure over the wall flow filter substrate now increases only linearly with the amount of diesel soot filtered out. FIG. 3 schematically shows the course of the banking-up pressure over the wall flow filter starting from the soot-free filter as a function of the amount of soot taken up. (1) is the banking-up pressure of the filter without soot, (2) is the increase during the deep-bed filtration phase and (3) is the linear increase in banking-up pressure during the filtercake formation phase.

Figure 4:
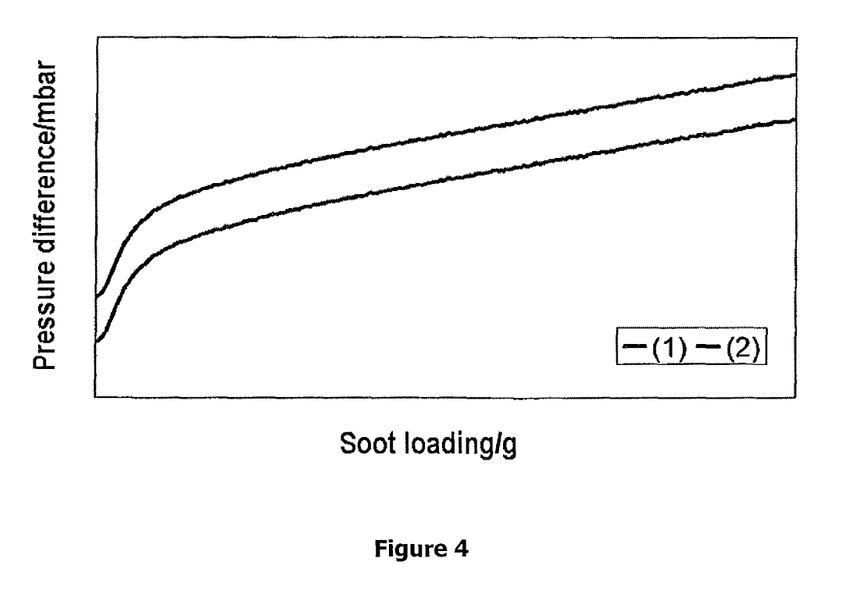
FIG. 4: Schematic depiction of the development of the banking-up pressure over different wall flow filter substrates as a function of the amount of soot taken up; here
(1) denotes the development of the banking-up pressure over an uncoated wall flow filter substrate;
(2) denotes the development of the banking-up pressure over a wall flow filter substrate with catalytic coating or soot ignition coating.

The above-described two-stage process of soot filtration in the wall flow filter substrate is generally valid; it is observed both in uncoated wall flow filter substrates and in wall flow filter substrates having a catalytically active coating, for example a reduction-catalytically active coating as described in EP 1 663 458. The initial configuration of the wall flow filter influences mainly the initial banking-up pressure of the component in the state without soot, as can be seen from FIG. 4. Conventional catalytically coated wall flow filter substrates (2) display a significantly higher initial banking-up pressure in the state without soot than uncoated wall flow filter substrates (1); however, the general course of the banking-up pressure curve with increasing soot loading is for the most part comparable to the general course of the banking-up pressure curve of the uncoated substrate (1). However, in the case of reduction-catalyst-coated wall flow filter substrates according to the prior art, the in-wall deep-bed filtration is, as indicated above, more strongly pronounced, which results in a steeper rise in the banking-up pressure curve in the deep-bed filtration curve.

The filter of the invention has, in addition to a (second) SCR-catalytic coating which is introduced into the wall between inflow channels and outflow channels, a first coating which is of such a nature that it closes the pores in the wall connecting the inflow channels and outflow channels to soot particles on the inflow side without preventing passage of the gaseous exhaust gas constituents. This is achieved by means of a coating which contains mostly one or more high-melting point oxides whose particle sizes are matched to the pore sizes in the wall of the wall flow filter substrate in such a way that the $d_{50}$ of the particle size distribution of the oxides is equal to or greater than the $d_5$ of the pore size distribution of the wall flow filter substrate, where at the same time the $d_{90}$ of the particle size distribution of the oxides is equal to or greater than the $d_{95}$ of the pore size distribution of the wall flow filter substrate. Here, the $d_{50}$ or the $d_{90}$ of the particle size distribution of the oxides is the particle size at which 50% or 90%, respectively, of the total volume of the oxides contains only particles whose diameter is smaller than or equal to the value indicated as $d_{50}$ or $d_{90}$, respectively. The $d_5$ or the $d_{95}$ of the pore size distribution of the wall flow filter substrate is the pore size at which 5% or 95%, respectively, of the total pore volume which can be determined by mercury porosimetry is formed by pores whose diameter is smaller than or equal to the value indicated as $d_5$ or $d_{95}$, respectively.

As an alternative, the function of this first coating can be to close the pores in the wall between inflow channels and outflow channels to soot particles without preventing passage of the gaseous exhaust gas constituents; in this case, the first coating can also be a coating which contains mostly a high-melting point fiber material which is deposited like a gas-permeable mat over the pore openings and thus makes penetration of even very fine soot particles into the pores significantly more difficult or, in the most favorable case, prevents it entirely. A suitable fiber material is selected so that the average length of the fibers is in the range from 50 to 250 µm and the average mass-based diameter of the fibers is equal to or smaller than the $d_{50}$ of the pore size distribution of the wall flow filter substrate, where the $d_{50}$ of the pore size distribution of the wall flow filter substrate is the pore size at which 50% of the total pore volume which can be determined by mercury porosimetry is formed by pores whose diameter is smaller than or equal to the value indicated as $d_{50}$.

Figure 6:
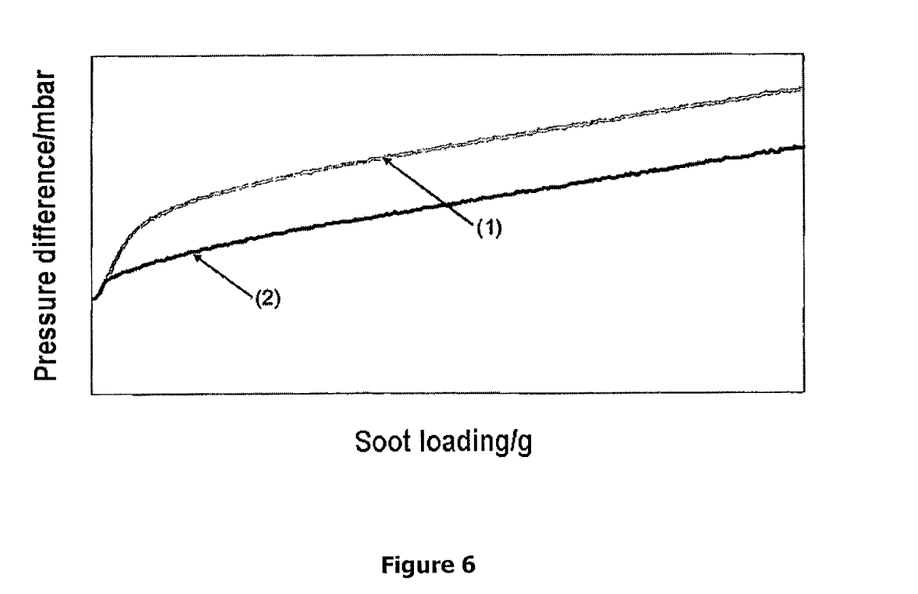
FIG. 6: Schematic depiction of the development of the banking-up pressure
(1) over a wall flow filter substrate according to the prior art without a coating which reduces deep-bed filtration;
(2) over a wall flow filter substrate according to the invention having a coating which reduces deep-bed filtration.

In both cases, this first coating leads to the deep-bed filtration being significantly decreased and the banking-up pressure increase observed during the deep-bed filtration phase thus being significantly reduced. FIG. 6 schematically shows the effect achieved by the applied coating.

The diesel particle filter of the invention contains a second coating which is introduced into the wall between inflow channels and outflow channels and is of such a nature that it effectively catalyzes the selective catalytic reduction of nitrogen oxides by means of a reducing agent. This coating contains one or more SCR-catalytically active components. These are preferably selected from the group consisting of:
(a) iron- and/or copper-exchanged zeolite compounds selected from among MOR, USY, ZSM-5, ZSM-20, beta-zeolite, CHA, FER and mixtures thereof; or
(b) iron- and/or copper-exchanged zeolite-like compounds selected from among SAPO-34 and ALPO-34 and mixtures thereof; or
(c) vanadium oxide, titanium oxide, tungsten oxide, molybdenum oxide, cerium oxide, zirconium oxide, niobium oxide, iron oxide, manganese oxide or mixtures or mixed oxides thereof; or
(d) mixtures of (a) and/or (b) and/or (c).

In the subgroup (a) mentioned, particular preference is given to MOR, ZSM-5, beta-zeolite, CHA and FER and very particular preference is given to beta-zeolite, CHA and FER. In the subgroup (b) mentioned, very particular preference is given to SAPO-34. In the subgroup (c) mentioned, particular preference is given to mixed oxides of cerium oxide, zirconium oxide, optionally tungsten oxide, optionally iron oxide and optionally niobium oxide.

Preferred embodiments of the components of the invention contain wall flow filter substrates which are made of silicon carbide, cordierite or aluminum titanate and have pores having an average diameter in the range from 5 to 50 µm, particularly preferably from 10 to 25 µm, in the walls between inflow and outflow channels.

The two coatings present in the component of the invention, of which the first coating (hereinafter referred to as "overcoat") serves to prevent deep-bed filtration while the second coating (hereinafter referred to as "SCR coating") serves to catalyze the selective catalytic reduction of nitrogen oxides effectively, act synergistically. As intended, the overcoat not only suppresses the in-wall deep-bed filtration but also increases the filtration efficiency of the filter. The SCR coating significantly decreases, as intended, the amount of nitrogen oxides in the exhaust gas penetrating through the filter. In addition, the combined action of the two coatings results in decoupling of the two reactions [(1) and (2)], the competition between which has a considerable adverse effect on the passive regeneration behavior of conventional reduction-catalyst-coated filters: the oxidative reaction of soot particles with $NO_2$ during the regeneration reaction (1) and the "SCR reaction", i.e. the comproportionation of NO and $NO_2$ with ammonia (2), which, as is generally known, proceeds fastest when NO and $NO_2$ are present in a ratio of approximately 1:1:

(1)

(2)

The combined action of the two layers present in the component of the invention results in the functions being separated and the competition between the two reactions being eliminated. Thus, soot can be reacted considerably more effectively with $NO_2$ without interference by the $deNO_x$ efficiency of the SCR coating and the passive regeneration behavior of the filter can again be significantly improved. The filter has to be subjected to active regeneration cycles more rarely. As a result, the thermal stress on the SCR coating decreases and therefore the long-term stability of the component in respect of $NO_x$ conversion and thus the effective $deNO_x$ action to be considered over the cycle are increased.

In selecting the material for the first coating which closes the pores in the wall connecting the inflow channels and outflow channels to soot particles on the inflow side without preventing passage of the gaseous exhaust gas constituents, it has to be noted that the materials used in the overcoat must not have any oxidation-catalytic activity in respect of ammonia so that the ammonia entering the filter is available in its entirety for the SCR reaction. The overcoat therefore advantageously does not contain any platinum. However, the overcoat can optionally contain palladium which does not have any oxidation-catalytic activity in respect of ammonia.

In an embodiment of the present invention, the materials used in the overcoat are not reduction-catalytically active, in particular not SCR-active. In an alternative embodiment of the present invention, the materials used in the overcoat are reduction-catalytically active, in particular SCR-active. In this case, particular preference is given to the SCR-active coatings of the first and second layers being different, i.e. not identical.

In a preferred embodiment, the materials used in the overcoat do not have an $NO_x$-storing action.

A preferred particle filter according to the invention comprises an overcoat which contains mostly one or more high-melting point oxides. For the overcoat to be of such a nature that the pores connecting the inflow channels and outflow channels are closed to soot particles without passage of the gaseous exhaust gas constituents being prevented, the materials used for the overcoat also have to be selected carefully with regard to the nature of the particles. In particular, the oxides to be used have to have a particle size distribution matched to the pore size distribution in the wall of the substrate. Correct function of the overcoat is achieved when the $d_{50}$ of the particle size distribution of the oxides is equal to or greater than the $d_5$ of the pore size distribution of the wall flow filter substrate and at the same time the $d_{90}$ of the particle size distribution of the oxides is equal to or greater than the $d_{95}$ of the pore size distribution of the wall flow filter substrate. (What is meant by the corresponding dx values of the particle size distribution and of the pore size distribution has been explained above.) Preference is given to using oxides whose particle size distribution has a $d_{50}$ greater than or equal to 5

μm at a $d_{90}$ greater than or equal to 20 μm. Particular preference is given to oxides having a $d_{50}$ in the range from 10 to 15 μm and a $d_{90}$ in the range from 25 to 40 μm. Oxides having a $d_{50}$ of from 10 to 15 μm and a $d_{90}$ of from 30 to 35 μm are preferably used. The latter not only have an optimized function in respect of reducing the deep-bed filtration but also display particularly good adhesion to the wall flow filter substrate.

In the case of some oxides, the particle size ranges required can readily be set by targeted premilling of the oxide before introduction into the wall flow filter substrate. To be able to utilize this advantage comprehensively and also achieve the required reaction properties of the overcoat, the oxides of the overcoat are preferably selected from the group consisting of aluminum oxide, rare earth metal-stabilized aluminum oxide, rare earth metal sesquioxide and mixtures thereof. Particular preference is given to aluminum oxide or rare earth metal-stabilized aluminum oxide.

To ensure very optimal function of the oxidic overcoat combined with a very low influence of the coating preventing deep-bed filtration on the initial banking-up pressure, the overcoat is preferably applied in a layer thickness of from 10 to 150 μm, particularly preferably from 20 to 100 μm, in the inflow channels of the wall flow filter substrate. In the case of the abovementioned choice of possible oxidic overcoat materials, such layer thicknesses can be obtained at a loading of from 1 to 50 g/l of solid, based on the volume of the wall flow filter substrate. Particular preference is given to loadings of from 1 to 20 g/l of solid, very particularly advantageously layer thicknesses of from 1 to 10 g/l of solid, based on the volume of the wall flow filter substrate.

To produce a diesel particle filter according to the invention having an oxidic overcoat, it is possible to use, for example, a conventional functionalized diesel particle filter which has an SCR-catalytically active coating in the wall between inflow and outflow channels as base component. The overcoat which reduces deep-bed filtration is then applied thereto. To produce the overcoat, a suitable oxide is selected and suspended in an amount of water which is at least twice the pore volume of the selected oxide. The aqueous suspension of the oxide obtained in this way is optionally milled by means of a Dyno mill until the required particle size distribution is obtained. The addition of auxiliaries to increase the sedimentation stability of the suspension at this stage of the production process is not harmful for the function of the overcoat to be produced as long as these auxiliaries can be completely removed thermally during the calcination in the last preparation step. The addition of adhesion-promoting agents such as silica and other inorganic sols is also not harmful as long as their oxidic calcination residues are neither ammonia-oxidation-catalytically active nor SCR-catalytically active in the component. The suspension is, after optional adjustment of the particle size distribution by milling, pumped into the inflow channels of the wall flow filter substrate to be coated. After complete filling of the inflow channels with the suspension, the excess suspension is sucked out again from the wall flow filter substrate. Here, the suction power has to be selected so that the prescribed loading remains as solid in the inflow channel at the end of the procedure. The wall flow filter substrate according to the invention which has been produced in this way is dried at from 80 to 180° C. in a stream of hot air and subsequently calcined at from 250 to 600° C., preferably from 300 to 500° C. After calcination, it is ready to use without further treatment.

A further preferred particle filter according to the invention comprises an overcoat which contains mostly a high-melting point fiber material. The fiber material has to have such a nature that in the inflow channels it forms a gas-permeable mat over the openings of the pores in the wall and thus makes entry of even very fine soot particles into the pores significantly more difficult or, in the most favorable case, largely prevents it. To ensure this, the fiber material has to be selected so that the average length of the fibers is in the range from 50 to 250 μm and the average mass-based diameter of the fibers is equal to or smaller than the $d_{50}$ of the pore size distribution of the wall flow filter substrate. The $d_{50}$ of the pore size distribution of the wall flow filter substrate is the pore size at which 50% of the total pore volume which can be determined by mercury porosimetry is formed by pores whose diameter is smaller than or equal to the value indicated as $d_{50}$. Preference is given to using fibers having an average fiber length of from 100 to 150 μm and an average mass-based diameter of the fibers of from 5 to 15 μm.

As also described above, as an alternative to oxides to be used, the fiber material can neither display oxidation-catalytic activity in respect of ammonia nor be reduction-catalytically, in particular SCR-catalytically, active. Furthermore, the fiber material has to be heat-resistant to such an extent that it withstands the normal operating and regeneration temperatures of the diesel particle filter in the range from 100 to 900° C., i.e. the melting point of the fibers has to be above 900° C. Many fiber materials which meet these technical requirements, for example asbestos, mullite, mineral wool having small fiber diameters and aluminum oxide fibers, release carcinogenic fiber dusts and/or display reduction-catalytic activity in respect of nitrogen oxides in the presence of ammonia. The fiber material used in the diesel particle filter of the invention is therefore preferably selected from the group of materials which are unproblematical in terms of health, consisting of rock wool, natural stone fibers and mineral wool having fiber diameters greater than 5 μm. Particular preference is given to using natural stone fibers. Such natural stone fibers consist predominantly of silicon dioxide, aluminum oxide, calcium oxide and magnesium oxide. They can additionally contain iron oxide and alkali metal oxides, in particular potassium oxide and sodium oxide. Suitable natural stone fibers are obtained, for example, from molten basalt. They can be obtained in various forms as insulation materials in the building materials trade.

The use of high-melting point fiber material for producing the overcoat enables the overcoat layer thicknesses in the component of the invention to be reduced to from 1 to 50 μm. An overcoat composed of high-melting point fiber material preferably has a layer thickness of from 3 to 30 μm. This can be obtained by means of an overcoat loading of from 1 to 30 g/l of solid, based on the volume of the wall flow filter substrate. Particular preference is given to loadings of from 2 to 15 g/l of solid, very particularly advantageously loadings of from 2 to 5 g/l of solid, based on the volume of the wall flow filter substrate.

The production of a diesel particle filter according to the invention having an overcoat containing high-melting point fiber material can likewise be carried out using a conventional wall flow filter substrate having an SCR-catalytically active coating in the wall by suspending the fiber material in a sufficient amount of water and pumping the suspension through the wall flow filter substrate from the inflow side. Here, the amount of suspension pumped into the substrate has to be selected so that the amount of fiber material obtained therein corresponds to the solids loading to be applied. A correspondingly high pump pressure is necessary for pumping the aqueous suspension through the wall. Small amounts of adhesion-promoting auxiliaries can optionally be added to the coating suspension as long as their particle sizes are large enough for them to remain in the interstices between the fibers and not penetrate into the pores between inflow and outflow channels. Silica and other inorganic sols may also be possible as adhesion-promoting auxiliaries as long as their oxidic calcination residues in the component are neither ammonia-oxidation-catalytically active nor SCR-catalytically active. After pumping the coating suspension through, the wall flow filter substrate is dried at 80 to 180° C. in a stream of hot air and subsequently calcined at from 250 to 600° C., preferably from 300 to 500° C. After calcination, it is ready to use without further treatment.

Compared to the production of a diesel particle filter according to the invention having an oxidic overcoat, in the case of production of a diesel particle filter according to the invention having a fiber overcoat, the coating suspension must not be sucked out from the inflow channels of the wall flow filter substrate since the suction stress would result in tearing-open of the introduced fiber mat and thus exposure of pores. The pores exposed in this way would continue to be accessible for soot particles; as a result, an increased degree of deep-bed filtration, a deterioration in the active and passive regeneration behavior and an at least partial deterioration in the long-term stability of the resulting component in respect of the $NO_x$ conversion activity would be observed.

In a further preferred embodiment, palladium can be added as oxidation-catalytically active component to the first coating which comprises mostly one or more high-melting point oxides (i.e. the oxidic overcoat) by mixing-in or impregnation. Palladium displays oxidation-catalytic activity in respect of residual hydrocarbons (HC) and carbon monoxide (CO) but not in respect of ammonia. The synergistic combined action of overcoat and SCR coating is therefore not adversely affected by the palladium. In addition, such a filter according to the invention acquires the ability to oxidize HC and CO, which are formed in increased amounts as secondary emission during active regeneration, to undamaging $CO_2$ and thus remove them directly.

The filter of the invention is particularly suitable for decreasing the amount of nitrogen oxides and particles in the exhaust gas from diesel engines. In the particular Pd-containing embodiment, the filter of the invention also decreases the amount of HC and CO and is therefore suitable for purifying the exhaust gases of diesel engines.

The invention is illustrated below with the aid of some figures and an example. The figures show.

(The SCR-catalytically active coating present in the wall is not shown for the sake of improved clarity of the drawing.)

EXAMPLE

A ceramic wall flow filter substrate type C650 from NGK having a diameter of 14.3764 cm and a length of 15.24 cm and having 46.5 cells per square centimeter and a wall thickness of 0.3048 mm was provided in a first step with an SCR-catalytically active coating. For this purpose, a beta-zeolite exchanged with 3% by weight of iron was firstly suspended in water and the resulting suspension was milled by means of a Dyno mill until the particle size distribution had a $d_{100}$ below 7 μm. The suspension was, after setting of a suitable solids content of about 30%, introduced into the walls of the above-mentioned wall flow filter substrate by pumping into the inflow channels and subsequent sucking out. The filter was subsequently dried for one hour at 120° C. in a fluidized bed and calcined for 30 minutes at 350° C. in a heating blower. The amount of SCR-catalytically active coating applied was about 100 g/l in the finished diesel particle filter, based on the volume of the component.

In a second coating step, the reduction-catalytically active diesel particle filter obtained in this way was provided with an oxidic overcoat which reduces deep-bed filtration.

To produce a suitable coating suspension for the overcoat, a suitable amount of aluminum oxide stabilized with 3% by weight of lanthanum sesquioxide was suspended by stirring in an amount of water corresponding approximately to 2.5 times the water absorption of the oxide used. The resulting suspension was milled by means of a Dyno mill until the particle size distribution had a $d_{50}$ appropriately matched to the pore size distribution of the substrate used of 7.36 μm and a $d_{90}$ of 17.82 μm.

The suspension was, after setting of a suitable solids content of about 4% of solids, applied to the previously SCR-catalyst-coated diesel particle filter by pumping the coating suspension into the inflow channels and subsequent sucking out. The filter was subsequently dried for two hours at 120° C. in a heating blower and, after heat treatment for half an hour in the heating blower at 350° C., calcined for two hours at 500° C. in a static furnace. The loading assigned to the overcoat in the finished reduction-catalytically active coated diesel particle filter was 10 g/l based on the volume of the component.

The invention claimed is:

1. A diesel particle filter, comprising:
    a ceramic wall flow filter substrate comprising inflow channels open at a first end of the wall flow filter substrate, outflow channels open at a second end of the wall flow filter substrate, and channel walls extending between the inflow channels and the outflow channels, the channel walls comprising pores that extend from openings at an inflow side to openings at an outflow side;
    a first coating in the inflow channels, the first coating forming closures at pore openings at the inflow sides of the channel walls that inhibit soot particles from entering the pores at the inflow sides without preventing passage of gaseous exhaust gas constituents through the pores; and
    a second coating inside the channel walls, the second coating being one that effectively catalyzes selective reduction of nitrogen oxides when in the presence of a reducing agent.

2. The diesel particle filter as claimed in claim 1, wherein the materials used in the first coating do not have any oxidation-catalytic activity with ammonia.

3. The diesel particle filter as claimed in claim 2, wherein the second coating contains one or more SCR-catalytically active components selected from the group consisting of:
    (a) iron- and/or copper-exchanged zeolite compounds selected from among MOR, USY, ZSM-5, ZSM-20, beta-zeolite, CHA, FER, and mixtures thereof; or
    (b) iron- and/or copper-exchanged zeolite-like compounds selected from among SAPO-34, ALPO-34, and mixtures thereof; or
    (c) vanadium oxide, titanium oxide, tungsten oxide, molybdenum oxide, cerium oxide, zirconium oxide, niobium oxide, iron oxide, manganese oxide, mixtures thereof, and mixed oxides thereof; or
    (d) mixtures of at least two of (a), (b), and (c).

4. The diesel particle filter as claimed in claim 2, wherein the first coating comprises, as a majority, one or more oxides,
    the $d_{50}$ of the particle size distribution of the oxides in the first coating is equal to or greater than the $d_5$ of the pore size distribution of the pores in the channel walls of the wall flow filter substrate,
    the $d_{90}$ of the particle size distribution of the oxides in the first coating is equal to or greater than the $d_{95}$ of the pore size distribution of the pores in the channel walls of the wall flow filter substrate,
    the $d_{50}$ or the $d_{90}$ of the particle size distribution of the oxides is the particle size at which 50% or 90%, respectively, of the total volume of the oxides contains only particles having diameters smaller than or equal to the value indicated as $d_{50}$ or $d_{90}$, respectively, and
    the $d_5$ or the $d_{95}$ of the pore size distribution of the wall flow filter substrate is the pore size at which 5% or 95%, respectively, of the total pore volume that can be determined by mercury porosimetry is formed of pores having diameters smaller than or equal to the value indicated as $d_5$ or $d_{95}$, respectively.

5. The diesel particle filter as claimed in claim 2, wherein the first coating comprises:
    as a majority, one or more oxides; and
    palladium, as an oxidation-catalytically active component.

6. The diesel particle filter as claimed in claim 1, wherein the second coating contains one or more SCR-catalytically active components selected from the group consisting of:
    (a) iron- and/or copper-exchanged zeolite compounds selected from among MOR, USY, ZSM-5, ZSM-20, beta-zeolite, CHA, FER, and mixtures thereof; or
    (b) iron- and/or copper-exchanged zeolite-like compounds selected from among SAPO-34, ALPO-34, and mixtures thereof; or
    (c) vanadium oxide, titanium oxide, tungsten oxide, molybdenum oxide, cerium oxide, zirconium oxide, niobium oxide, iron oxide, manganese oxide, mixtures thereof, and mixed oxides thereof; or
    (d) mixtures of at least two of (a), (b), and (c).

7. The diesel particle filter as claimed in claim 6, wherein the first coating comprises, as a majority, one or more oxides
    the $d_{50}$ of the particle size distribution of the oxides in the first coating is equal to or greater than the $d_5$ of the pore size distribution of the pores in the channel walls of the wall flow filter substrate,
    the $d_{90}$ of the particle size distribution of the oxides in the first coating is equal to or greater than the $d_{95}$ of the pore size distribution of the pores in the channel walls of the wall flow filter substrate,
    the $d_{50}$ or the $d_{90}$ of the particle size distribution of the oxides is the particle size at which 50% or 90%, respectively, of the total volume of the oxides contains only particles having diameters smaller than or equal to the value indicated as $d_{50}$ or $d_{90}$, respectively, and
    the $d_5$ or the $d_{95}$ of the pore size distribution of the wall flow filter substrate is the pore size at which 5% or 95%, respectively, of the total pore volume that can be determined by mercury porosimetry is formed of pores having diameters smaller than or equal to the value indicated as $d_5$ or $d_{95}$, respectively.

8. The diesel particle filter as claimed in claim 6, wherein the wall flow filter substrate comprises silicon carbide, cordierite, or aluminum titanate, and
    the pores present in the channel walls between inflow and outflow channels have an average diameter in the range from 5 to 50 μm.

9. The diesel particle filter as claimed in claim 6, wherein the first coating comprises, as a majority, a fiber material comprising fibers with an average length in the range from 50 to 250 μm, and an average mass-based diameter equal to or smaller than the $d_{50}$ of the pore size distribution of the pores in the channel walls of the wall flow filter substrate,
    the $d_{50}$ of the pore size distribution of the pores in the channel walls of the wall flow filter substrate is the pore size at which 50% of the total pore volume that can be determined by mercury porosimetry is formed of pores having diameters smaller than or equal to the value indicated as $d_{50}$.

10. The diesel particle filter as claimed in claim 1, wherein the first coating comprises, as a majority, one or more oxides,
the $d_{50}$ of the particle size distribution of the oxides in the first coating is equal to or greater than the $d_5$ of the pore size distribution of the pores in the channel walls of the wall flow filter substrate,
the $d_{90}$ of the particle size distribution of the oxides in the first coating is equal to or greater than the $d_{95}$ of the pore size distribution of the pores in the channel walls of the wall flow filter substrate,
the $d_{50}$ or the $d_{90}$ of the particle size distribution of the oxides is the particle size at which 50% or 90%, respectively, of the total volume of the oxides contains only particles having diameters smaller than or equal to the value indicated as $d_{50}$ or $d_{90}$, respectively, and
the $d_5$ or the $d_{95}$ of the pore size distribution of the wall flow filter substrate is the pore size at which 5% or 95%, respectively, of the total pore volume that can be determined by mercury porosimetry is formed of pores having diameters smaller than or equal to the value indicated as $d_5$ or $d_{95}$, respectively.

11. The diesel particle filter as claimed in claim 10, wherein the oxides in the first coating have a particle size distribution having a $d_{50}$ greater than or equal to 5 μm and a $d_{90}$ greater than or equal to 20 μm.

12. The diesel particle filter as claimed in claim 11, wherein the oxides in the first coating are selected from the group consisting of aluminum oxide, rare earth metal-stabilized aluminum oxide, rare earth metal sesquioxide, and mixtures thereof.

13. The diesel particle filter as claimed in claim 12, wherein the first coating has a layer thickness of from 10 to 150 μm.

14. The diesel particle filter as claimed in claim 1, wherein the first coating comprises, as a majority, a fiber material comprising fibers with an average length in the range from 50 to 250 μm and an average mass-based diameter equal to or smaller than the $d_{50}$ of the pore size distribution of the pores in the channel walls of the wall flow filter substrate,
the $d_{50}$ of the pore size distribution of the pores in the channel walls of the wall flow filter substrate is the pore size at which 50% of the total pore volume that can be determined by mercury porosimetry is formed of pores having diameters smaller than or equal to the value indicated as $d_{50}$.

15. The diesel particle filter as claimed in claim 14, wherein the fiber material is selected from the group consisting of rock wool, natural stone fibers, and mineral wool, and fibers in the fiber material have fiber diameters greater than 5 μm.

16. The diesel particle filter as claimed in claim 15, wherein the first coating has a layer thickness of from 1 to 50 μm.

17. The diesel particle filter as claimed in claim 1, wherein the wall flow filter substrate comprises silicon carbide, cordierite, or aluminum titanate, and
the pores present in the channel walls have an average diameter in the range from 5 to 50 μm.

18. The diesel particle filter as claimed in claim 1, wherein the first coating comprises:
as a majority, one or more oxides, and
palladium, as an oxidation-catalytically active component.

19. A method for purifying the exhaust gases of a diesel engine, comprising:
utilizing a diesel particle filter according to claim 18 in a diesel engine exhaust stream.

20. A method of decreasing the amount of nitrogen oxides and particles in an exhaust gas from a diesel engine, comprising:
utilizing a diesel particle filter according to claim 1 in a diesel engine exhaust stream.

* * * * *